United States Patent

[11] 3,584,503

[72] Inventor Donald A. Senour
Carlisle, Mass.
[21] Appl. No. 882,001
[22] Filed Dec. 4, 1969
[45] Patented June 15, 1971
[73] Assignee BLH Electronics Inc.
Waltham, Mass.

[54] AIRCRAFT WEIGHT AND CENTER OF GRAVITY DETERMINATION SYSTEM WHICH INCLUDES ALARM, SELF-CHECKING, AND FAULT OVERRIDE CIRCUITRY
10 Claims, 2 Drawing Figs.

[52] U.S. Cl. .................................................. 73/65,
235/150.2
[51] Int. Cl. ...................................................... G01m 1/12
[50] Field of Search.......................................... 73/65;
177/136; 235/150.2; 340/408

[56] References Cited
UNITED STATES PATENTS

| | | | |
|---|---|---|---|
| 2,443,045 | 6/1948 | Magruder et al. | 73/65 |
| 2,948,146 | 8/1960 | Bergeson | 73/65 |
| 3,426,586 | 2/1969 | Kadlec | 73/65 X |
| 3,513,300 | 5/1970 | Elfenbein et al. | 73/65 X |

OTHER REFERENCES

B. J. Hawkins, " STAN - for Aircraft Take-Off Weight and Balance," INSTRUMENTS & CONTROL SYSTEM, Vol. 38, Feb., 1965, pp. 89-93, copy in 73-65.

*Primary Examiner*—Charles A. Ruehl
*Attorneys*—James E. Mrose and Mary C. Thomson ABSTRACT: An aircraft gross weight and center of gravity determination system is provided for measuring, computing and displaying the aircraft gross weight and to determine the center of gravity thereof. The weight of the aircraft and the distribution of the weight are sensed with strain gage transducers mounted in the landing gear axles and in the nose restraint. The output voltage from the transducers is a function of the vertical load thereon. The system incorporates circuitry for determining when the aircraft center of gravity is beyond a preset limit, self-checking circuitry for determining if each channel and component part of the system is functioning properly, and fault override circuitry for utilizing a complimentary and symmetrical channel in place of a detected faulty channel whereby accurate measurements may be obtained despite the faulty channel.

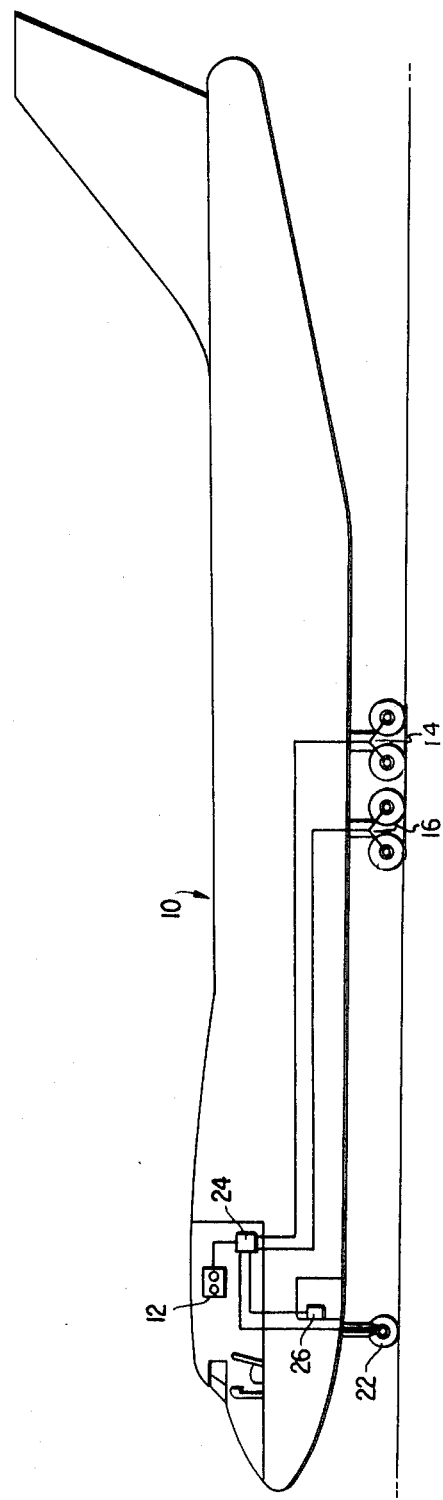

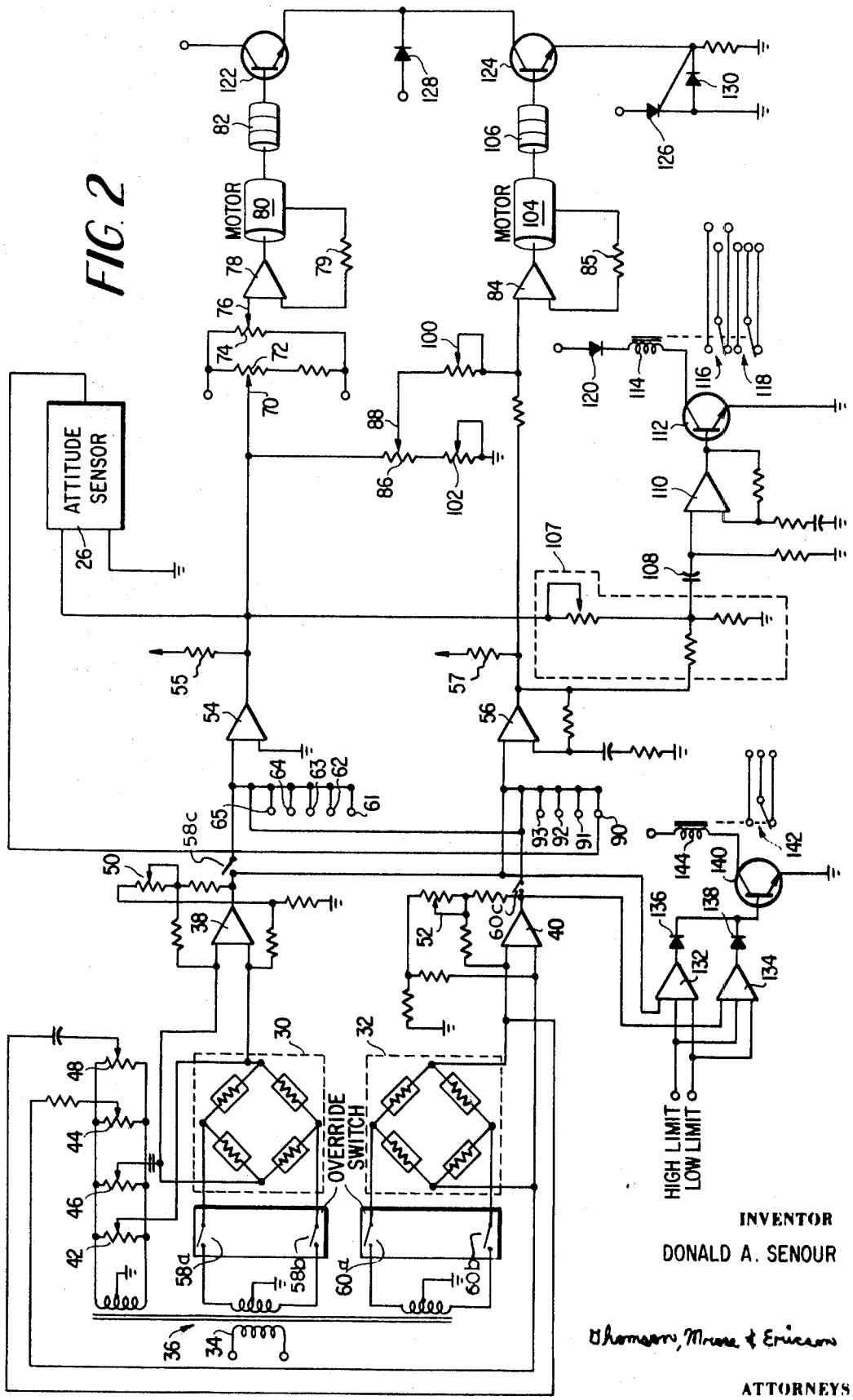

AIRCRAFT WEIGHT AND CENTER OF GRAVITY DETERMINATION SYSTEM WHICH INCLUDES ALARM, SELF-CHECKING, AND FAULT OVERRIDE CIRCUITRY

BACKGROUND OF THE INVENTION

This invention relates to an aircraft weight and center of gravity determination system and more particularly to an onboard aircraft weight and center of gravity determination system which contains alarm circuitry for indicating when the aircraft's center of gravity is beyond a preset limit, self-checking and fault location circuitry to determine if the system is functioning properly, and fault override circuitry which utilizes the system's symmetry for transferring a faulty channel to its compliment such that an accurate measurement can be obtained regardless of the faulty channel.

Since the first airplane was developed, aircraft weight and center of gravity location have been prime factors in establishing safe and efficient takeoff and flight conditions. As today's aircraft increase in size, speed and payload, these factors become increasingly important.

In the past, weight and center of gravity determination of aircraft was a long and laborious procedure. It required the jacking of the aircraft at several points through load cells or towing the aircraft onto properly arranged weighing scales.

Recently, systems have been developed where it is now possible to determine weight and center of gravity with integrally mounted transducers and instrumentation. A direct indication of gross weight and center of gravity can be provided in the aircraft's cockpit or cargo area. With such a system, it is no longer necessary to underload the aircraft to insure safe takeoff and flight conditions. Laborious and time-consuming weighing of each and every piece of cargo can be avoided. Higher payloads can be transported without compromising safety. Weight control of the aircraft with and without fuel is greatly enhanced.

While generally satisfactory, the previous aircraft weight and center of gravity determination systems had no means for automatically providing an alarm signal when the aircraft's center of gravity was beyond a preset limit. Moreover, the prior art systems had no means for providing a self-check to assure system integrity and to locate faults, nor did such systems have provisions for overriding faults and maintaining system operations should such become necessary. The extreme importance of alarm, self-check and fault overriding circuitry is readily apparent in that it allows the aircraft operator to continuously be apprised both before and during flight that the aircraft is and can be flown safely. Such circuitry also would enable faults to be located quickly and due to the override feature, allow measurements to be continuously and accurately obtained until repairs can be made.

SUMMARY OF THE INVENTION

Accordingly, it is one object of the present invention to provide a new and improved aircraft weight and center of gravity determination system.

Another object of this invention is to provide a unique onboard aircraft weight and center of gravity determination system which contains an alarm for automatically indicating when the aircraft's center of gravity is beyond a preset limit.

Yet another object of the invention is the provision of a unique aircraft weight and center of gravity determination system which includes override circuitry such that upon the location of a faulty channel, the same may be disconnected and a complimentary channel substituted therefore so that accurate aircraft weight and center of gravity measurements can be made despite the faulty channel.

One other object of this invention is the provision of a new and improved unique onboard aircraft weight and center of gravity determination system which includes alarm, self-checking and fault override circuitry in a compact arrangement.

By way of a summary account of practice of this invention in one of its aspects, the onboard aircraft weight and center of gravity determination system of the present invention includes transducers located in each wheel axis of the aircraft, an attitude sensor, a computer and an indicator-control unit. The transducers provide electrical signals which are proportional to the landing gear loads. The computer receives and sums these signals to provide appropriate outputs to the gross weight and center of gravity indicators. The center of gravity indicator contains an alarm which indicates when the aircraft's center of gravity shifts past a preset location. Self-checking and fault location circuitry which determine if the system is malfunctioning is contained within the computer section. If there is a malfunction indication, the self-checking and fault location circuitry will pinpoint the problem in a particular channel so that a fault override may be initiated. In this operating mode, the computer will estimate the load which can be expected from the inoperable channel on the basis of a complimentary axle load. The resultant final readouts are then only slightly less accurate than those obtained under normal operational conditions.

BRIEF DESCRIPTION OF THE DRAWINGS

Although the features of this invention which are considered to be novel are expressed in the appended claims, further details as to preferred practices and as to the further objects and features thereof may be most readily comprehended through reference to the following description when taken in connection with the accompanying drawings, wherein:

FIG. 1 portrays an aircraft incorporating the gross weight and center of gravity determination system according to the present invention; and, FIG. 2 schematically illustrates the circuitry of the aircraft gross weight and center of gravity determination system of the present invention.

DETAILED DESCRIPTION OF THE PREFERRED EMBODIMENT

Referring now to the drawings, wherein like reference numerals designate identical, or corresponding parts throughout the several views and more particularly to FIG. 1 thereof, wherein a typical aircraft 10 is shown as incorporating wherein an onboard aircraft weight and center of gravity determination system according to the present invention. The aircraft 10 has four main gear landing bogies, two of which are shown on 14 and 16. Two complementary bogies (not shown) exist on the opposite side of the aircraft 10. Additionally, the aircraft 10 includes a single nose landing gear 22. It should be understood, however, that depending upon the size, speed and payload of the aircraft, any desired number and arrangement of landing gears could be provided. Each landing gear bogey includes four transducers therein, such as of the foiled strain gage type, one for each axle thereof. In addition, two transducers are provided in the nose gear axle 22. The transducers are attached inside each axle by means of two lightweight expansion collets which expand radially when compressed axially. The transducers thus sense deflections using a shear sensing principle and the deflections are directly proportional to a vertical reaction and are unaffected by extraneous and asymmetrical loads. Reference may be made to U.S. Pat. No. 3,426,586 to Kadlec for a detailed description of one type of transducer and the manner of mounting the same within the landing gear axles that may be used in conjunction with the present invention.

Within the aircraft 10, a computer module 24 is conveniently located, such, for example, as in the flight deck equipment rack for summing the output voltage from the transducers such that the aircraft gross weight and center of gravity may be readily obtained.

Understanding that all runways are not perfectly level and that center of gravity indications on an inclined aircraft will be different from those existing in a level flight attitude, an attitude sensor 26, which may be a strain gage type inclinometer or the like, is provided to sense the angle of inclination on the aircraft and to generate a signal for automatically correcting the center of gravity indication to level flight attitude.

Additionally, an indicator-control panel 12, which may be mounted upon the flight engineer's panel, is provided for giving a digital indication of gross weight in pounds (or kilograms) and the longitudinal center of gravity in percent of the Mean Aerodynamic Chord.

The aircraft weight and center of gravity determination system of FIG. 1 incorporates therein circuitry, as described hereinafter with reference to FIG. 2, for providing an alarm in the event the aircraft enter of gravity exceeds a given level. Also included, as shown in FIG. 2, is circuitry for indicating system malfunction and in such case for locating the particular malfunctioning channel to initiate a fault override. In this operating mode, the computer module 24 will estimate the load that can be expected from the inoperable channel on the basis of a symmetrical and complimentary load. The resulting final readouts appearing upon the indicator-control panel 12 will still be within acceptable limits.

Referring now to FIG. 2, the aircraft weight and center of gravity determination system incorporating alarm, self-checking and fault override circuitry is therein shown and will be described in its various modes of operations. Since the input signals generated in the landing gear (such as 14 and 16 in FIG. 1) and the nose gear (22 in FIG. 1) have similar circuitry, only the left and right wing data channels will be discussed as being typical of all inputs.

In the aircraft weighing mode, the outputs from the individual transducers including strain gage responsive elements therein are combined to obtain a signal that represents the total reaction supported by the respective gear. The combining is achieved in the computer module 24 by AC exciting all parallel connected Wheatstone bridge circuit arrangements which include the gear responsive strain gages in the arms thereof, such, for example, as the right wing bridge circuit arrangement 30 and the left wing bridge circuit arrangement 32, from a single excitation winding 34 of the transformer generally indicated as 36. Typically, the excitation signal may be a 10 volt, 400 Hertz signal.

A conventional right-wing amplifier 38 and a left-wing amplifier 40, such as of the AC operational type $\mu$A709, are used to raise the signal level from the Wheatstone bridge transducers to the voltage level required for the gross weight and center of gravity computation circuitry. Additionally, the amplifier input circuits each respectively include a zero adjust potentiometer 42 and 44 for providing the appropriate voltage to establish a zero input thereto, and a capacitive balance potentiometer 46 and 48 for removing any quadrature unbalance. The gain of the amplifiers 38 and 40 are set through the adjustment of respective potentiometers 50 and 52 which control the feedback thereof and consequently, the overall gain of each amplifier channel. The output of the amplifiers 38 and 40 are then each coupled to a gross weight summing amplifier 54, which may be of the AC operational type, through respective override switches 58 and 60, which may be spring-loaded connectors. An output signal is also made available from each of the input amplifiers 38 and 40 to a conventional airborne integrated data system through resistors 55 and 57. Before continuing, it should be understood that in addition to the right and left wing transducer signals as described above, the gross weight summing amplifier 54 will receive signals on input terminals 61 thru 65 for each of the other gear transducers. The amplified signal at the output of the gross weight-summing amplifier 54 is then connected to the arm 70 of a zero potentiometer 72 in phase opposition to the voltage across a gross weight rebalancing slide-wire potentiometer 74. It should be understood that the slidewire voltage may be supplied by a separate gross weight reference winding on the secondary of transformer 36. The arm 76 of the slidewire potentiometer 74 is connected to the input of a gross weight servoamplifier 78. The gross weight servoamplifier 78 may be any conventional type and the output thereof is used to drive a conventional servomotor 80, which may be of the two-phase induction type. When the input transducive Wheatstone bridge circuits unbalance in response to a load being applied thereto, an error signal, which is the difference between the signal from the summing amplifier 54 and the gross weight reference signal across the slidewire arm 76, will appear at the input to the gross weight servoamplifier 78. The error signal so produced will be of sufficient strength to drive the servomotor 80. Now, since the slidewire potentiometer 74 is driven by the servomotor 80, the servomotor 80 will continue to drive until the input circuit is again at balance. When this happens, the servomotor 80 will stop and the system will remain in balance until there is a further change in the input signal. A conventional readout 82, such as of the digital type, is mechanically coupled to the servomotor 80 and at balance the reading will represent the sum of the weight of the load on the aircraft axles.

For center of gravity determination, the input circuits thereto are the same as those described with reference to the gross weight above. All of the signals fed to the gross weight-summing amplifier 54, with the exception of the main body gear signals, are fed to the center of gravity summing amplifier 56. Also, the output from the attitude sensor 26 is applied to the center of gravity-summing amplifier 56 at terminal 90, so that the aircraft slope error is automatically corrected. The center of gravity signal at the output of the summing amplifier 56 is also made available through resistor 57 for the airborne integrated data system and is simultaneously applied to a center of gravity servoamplifier 84. The amplified signal at the output of the center of gravity summing amplifier 56 is referenced to the gross weight signal at the input to the center of gravity servoamplifier 84. More particularly, the output of the gross weight summing amplifier 54 is fed to a balance slidewire 86 for the center of gravity servoamplifier 84. The arm 88 of the slidewire 86 is connected to a potentiometer 100 to the center of gravity servoamplifier 84 in phase opposition to the input from the center of gravity summing amplifier 56. A zero control potentiometer 102 is in series with the slidewire 86 to establish a zero point at the low end of the slide-wire travel. A different signal at the input to the center of gravity servoamplifier 56 will drive a servomotor 104 to indicate upon a readout device 106, such as of the digital type, the aircraft center of gravity in terms of Mean-Aerodynamic-Chord in a similar fashion to that for gross weight.

The gross weight and center of gravity determination system also, as explained hereinafter, contains alarm circuitry which is activated whenever the center of gravity location is outside a preset limit so that the flight engineer can immediately take corrective action to avoid a dangerous condition. The alarm circuitry operates by continuously monitoring the outputs of the gross weight summing amplifier 54 and the center of gravity summing amplifier 56 by comparing through a voltage divider 107 a voltage proportional to the reaction moments about the body landing gear with a voltage proportional to a gross weight calibrating signal. When an alarm condition exists, the resultant signal which is capacitively coupled through a capacitor 108 to the input of an amplifier 110, such as of the AC operational type $\mu$A709, will cause the amplifier output to turn on a transistor 112, the base of which is connected to the amplifier output. The transistor 112 has a relay coil 114 connected to the transistor collector and in the on condition will act as a switch to energize relay 114 and thereby close contacts 116 and 118. The collector circuit power is supplied from a voltage source through a diode rectifier-filter 120. When the center of gravity alarm relay contacts 116 and 118 close, a voltage source will be respectively connected to an alarm indicator light upon the indicator-control panel 11 (FIG. 1), and to an external alarm function, such as an audible sounding device.

It should also be understood that within the gross weight and center of gravity determination system of the present invention is provided self-checking circuitry to interrogate each input channel, the computing instrument and the attitude sensor to determine if the same are properly functioning. Indicator lights upon the indicator-control panel 12 (FIG. 1) will indicate whether or not the system is functioning properly.

In particular, a system check switch, (not shown in the drawings) when switched to various positions, will apply known voltages to the system inputs. The system response to these known input voltages can then be compared with expected limits to determine if proper functioning exists.

Thus, when the system check switch is placed in the instrument position, fixed phase and driven phase voltages are applied to the gross weight motor 80 and to the center of gravity motor 104, while preset signals are applied to the input circuits of the channel amplifiers and the output of the attitude sensor 26 is shorted. If the digital readouts 82 and 106 are driven to their appropriate readings, an aperture therein will allow a light source to trigger a light-sensitive transistor 122 connected to the gross weight digital readout 82 and a light-sensitive transistor 124 connected to the center of gravity digital readout 106. If both light-sensing transistors 122 and 124 turn on, then the same which form an AND gate along with diodes 128 and 130 will gate a silicon-controlled rectifier switch 126. The gating of silicon-controlled rectifier switch 126 will energize a relay to indicate that the servomotors 80 and 104 are properly functioning. If either digital readout 82 and 106 is not driven to their appropriate reading then the AND gate will not provide a signal for triggering the silicon-controlled rectifier switch 126 and hence a faulty condition will be indicated.

Then the system check switch is placed in the channel positions, each of the channel amplifier preset outputs, such, for example, as right wing channel amplifier 38, and left wing channel amplifier 40, are compared against a high and low voltage limit in a separate conventional comparator. For example, the right-wing channel amplifier 38 is compared with high and low voltage limits in a conventional comparator 132, while the left wing channel amplifier 40 is compared with high and low voltage limits in a conventional comparator 134. Under normal operating conditions, the comparator outputs will be zero and a correct system condition indicated. However, when the input signals applied to comparators 132 and 134 exceed either limit point, an output from either or both will be produced and thereby trigger respective diodes 136 or 138 which, in turn, turn on a transistor switch 140 to thereby energize and switch a relay contact 142. The relay is energized through a power supply connected to a coil 144 which, in turn, is connected to the collector of the transistor 140. Upon closing of the relay contact 142, a faulty condition in one of the amplifier channels will be indicated.

When the system check switch is in the attitude position, the proper functioning of the attitude sensor 26 is determined by again applying preset voltages to the inputs of the channel amplifiers 38 and 40, unshorting the output of the attitude sensor 26, and setting the attitude sensor 26 to a fixed inclination. If the attitude sensor 26 is functioning properly, transistors 122 and 124 will turn on, gating the silicon-controlled rectifier switch 126 and thereby energize the servo relay to indicate a proper functioning of the attitude sensor 26. When the system check switch is placed in the alarm position, preset signals are applied to the channel amplifiers which have a center of gravity component outside the preset limit so that if the alarm circuitry is functioning properly, the alarm relays 116 and 118 will be activated.

It should also be understood that the gross weight and center of gravity determination system of the present invention uniquely incorporates fault override circuitry such that if any input channels should become inoperative, in that the transducer or channel amplifier is defective, a corresponding or similar signal from a complimentary and symmetrical channel can be utilized. For example, if it is determined by sequentially checking each channel that the right wing main gear transducer 30 is defective, the fault override switch 58 can be used to open that channel and to connect the signal from the left wing main gear into the right wing comparator circuit. Since the substituted complimentary signal is not identical to the true signal that the defective channel would provide if functioning properly, an indicator upon the indicator control panel 12 (see FIG. 1) will be illuminated to alert the operator that the gross weight and center of gravity readouts may be somewhat inaccurate due to unequal load distributions, within tolerable limits.

It should now be apparent that the gross weight and center of gravity determination system of the present invention uniquely incorporates circuitry for providing an alarm when the center of gravity is outside a preset limit, includes self-checking circuitry for checking the proper functioning of the system channels and other components, and provides a fault override for utilizing a complimentary channel in the event a faulty channel is detected.

Obviously, numerous modifications and variations of the present invention are possible, in light of the above teachings. It is therefore to be understood, that within the scope of the teachings herein in the appended claims, the invention may be practiced otherwise than as specifically described.

What I claim and desire to be secured by Letters Patent of the United States is:

1. An aircraft gross weight and center of gravity determination system comprising; a plurality of transducer channels mounted in relation to the aircraft landing gear axles for generating signals representative of a load experienced by said landing gear axles, a plurality of amplifiers for amplifying said generated signals from said plurality of transducer channels, means responsive to said amplified generated signals for determining the gross weight of said aircraft and the center of gravity thereof, means for self-checking said plurality of transducer channels, said plurality of amplifiers, and said means responsive to determine the proper functioning thereof, and, means for providing a fault override if in improper functioning of any of said plurality of transducers or said amplifying means is detected, whereby a complimentary and symmetrical transducer or amplifier channel will be substituted for said improper functioning transducer and amplifier channels such that an accurate gross weight and center of gravity measurement can be made despite said improper functioning channel.

2. An aircraft gross weight and center of gravity determination system as in claim 1, wherein is further included attitude sensing means for sensing the angle of inclination of said aircraft and for automatically correcting the center of gravity measurement therefore.

3. An aircraft gross weight and center of gravity determination system as in claim 2, wherein is further included alarm means for both visually and audibly indicating when said aircraft center of gravity is outside a preset limit.

4. An aircraft gross weight and center of gravity determination system as in claim 2, wherein said self-checking means includes a plurality of comparators, each of which is responsive to a predetermined separate transducer channel output signal for sequentially comparing said output signal between high and low voltage limits and switching means connected to the outputs of said comparators for indicating whether each of said channels are properly functioning.

5. An aircraft gross weight and center of gravity determination system as in claim 4, wherein said alarm means includes an operational amplifier for comparing a voltage proportional to the reaction moments about said aircraft landing gear with a signal proportional to said gross weight.

6. An aircraft gross weight and center of gravity determination system as in claim 5, wherein said means for determining gross weight includes an operational summing amplifier responsive to said amplified transducer output signals, a balancing circuit arrangement connected resistively to the output of said summing amplifier for providing an unbalanced signal in an amount proportional to said gross weight, a servomotor which is driven in an amount proportional to said unbalanced signal, and a readout device which is responsive to the driving of said motor for indicating said gross weight.

7. An aircraft gross weight and center of gravity determination system as in claim 6, wherein said means for determining the center of gravity includes an operational amplifier responsive to said transducer output signals and an output from said attitude-sensing means, a resistive balancing circuit arrangement connected to the output of said operational amplifier which provides an unbalanced signal in an amount proportional to said center of gravity, a servomotor which is driven in an amount proportional to said center of gravity unbalanced signal and a readout device which is responsive to the driving of said center of gravity motor for indicating the aircraft center of gravity.

8. An aircraft gross weight and center of gravity determination system as in claim 7, wherein said self-checking means further includes first and second light-sensitive transistors connected to the outputs of said gross weight and said center of gravity readouts for turning on upon proper functioning of said gross weight and center of gravity-determining means, a silicon-controlled rectifier for switching upon activation of both said first and second light-sensitive transistors, and relay means connected to said silicon-controlled rectifier switch for indicating said proper functioning.

9. An aircraft gross weight and center of gravity determination system as in claim 8, wherein each of said transducer channels includes a Wheatstone bridge circuit arrangement which includes electrical strain gage responsive elements connected in the arms thereof and mounted within expanding collets so as to respond to vertical loads only.

10. An aircraft gross weight and center of gravity determination system as in claim 9, wherein said plurality of amplifiers are each integrated circuit operational amplifiers.